July 13, 1965 R. E. GELLER ETAL 3,194,702

METHOD OF MAKING SELF-LUBRICATING BEARING MEANS

Filed Jan. 3, 1962 3 Sheets-Sheet 1

INVENTORS
RODGER E. GELLER
HARRY J. COUCH
BY *Albert H. Reuther*
THEIR ATTORNEY

July 13, 1965  R. E. GELLER ETAL  3,194,702

METHOD OF MAKING SELF-LUBRICATING BEARING MEANS

Filed Jan. 3, 1962  3 Sheets-Sheet 2

INVENTORS
RODGER E. GELLER
HARRY J. COUCH
BY
*Albert H. Reuther*
THEIR ATTORNEY

INVENTORS
RODGER E. GELLER
HARRY J. COUCH
BY
THEIR ATTORNEY

United States Patent Office 3,194,702
Patented July 13, 1965

3,194,702
METHOD OF MAKING SELF-LUBRICATING
BEARING MEANS
Rodger E. Geller, Dayton, and Harry J. Couch, Vandalia, Ohio, assignors to General Motors Corporation, Detroit, Mich., a corporation of Delaware
Filed Jan. 3, 1962, Ser. No. 164,089
2 Claims. (Cl. 156—3)

This invention relates to preparation of a multi-part preform of fibrous bearing material, and, more particularly, to a self-lubricating bearing surface on a backing means to which fluorine-containing resin material can be attached.

An object of this invention is to provide a new and improved procedure for making a self-lubricating bearing surface with a backing portion to which fluorine-containing resin material is attached such as by electrostatic flocking, as a mixture of fibers and resin backing, as a dry blend slurry and the like as well as an oriented condition and in radially extending directions.

Another object of this invention is to provide a multi-part preform of fibrous bearing material including a backing portion of cellulose including paper and woven cotton ducking, felt, elastomer as well as a mastic means exemplified by phenolic resin and epoxy to which low-friction plastic materials from a group including polytetrafluoroethylene also referred to herein by a trade name Teflon, polyamide identified as nylon as well as acetal resin also called by a trade name Delrin herein become added for use as a self-lubricating bearing surface by electrostatic flocking thereof, by mechanical interlocking therewith such as by a thin punched or die-cut sheet perforated or in concentric rings to permit limited flow of the mastic means therebetween, and by a slurried mixture of mastic means and low-friction plastic material exposed by partial removal of the mastic means subject to attack chemically by etching with a weak alkaline or acid solution or mechanically by sand blasting, grinding and otherwise abrading.

Another object of this invention is to provide a multi-part preform of back-up material to which a resin adhesive means is added for holding individual fibrous particles of low-friction plastic material at least partially penetrating the adhesive means due to deposition thereto electrostatically or mechanically subject to orientation in a particular direction for use as a self-lubricating bearing surface.

A further object of this invention is to provide a procedure for manufacture of an article for use as a multi-part preform of backup material including steps of layering a mobile resinous mastic means onto the back-up material, adding predetermined short low-friction fibrous particles substantially transversely by flocking to the mastic means immobilized thereby and forming the combined back-up material, mastic means and fibrous particles into a curved preform as a self-lubricating bearing surface.

Another object of this invention is to provide a self-lubricating bearing means utilizing a mixture of resinous material exemplified by epoxy, phenolic as well as curable mastic and of suitable fibers of cellulose, felty and similar materials as a carrier for short particles of low-friction material from a group including polytetrafluoroethylene or Teflon, polyamide or nylon as well as acetal resin or Delrin in a dry blend, slurry or pasty mass moldable to a predetermined shape.

Further objects and advantages of the present invention will be apparent from the following description, reference being had to the accompanying drawings wherein preferred embodiments of the present invention are clearly shown.

In the drawings:
FIGURE 1 illustrates flocking procedure for making a self-lubricating bearing means in accordance with the present invention.

Figure 1:
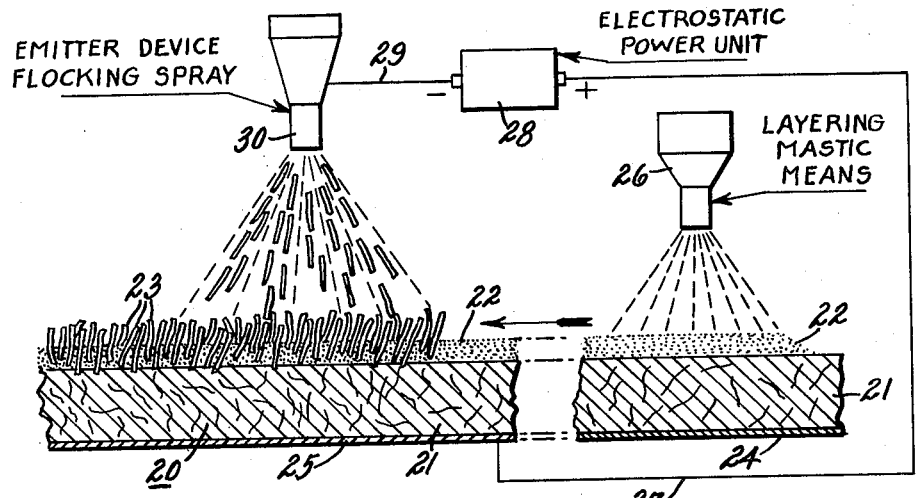

A need exists for producing economically and effectively a self-lubricating bearing means which can be caused to conform to a curved configuration. Such a bearing means can include a multi-part preform generally indicated by numeral 20 in FIGURE 1. This preform 20 includes a back-up or backing portion 21 of fibrous material including cellulose fiber, paper and woven cotton ducking, felt, and similar substances. A layering of an adhesive or mastic means such as epoxy or phenolic resins is added to the backing portion 21 which can be impregnated therewith. This layering is indicated by reference numeral 22 in FIGURE 1 and substance thereof is relatively mobile pending addition thereto of a plurality of relatively short low-friction fiber-like or fibrous means 23 by spraying or flocking thereof into positions substantially transverse to the layering 22. The fiber-like or fibrous particles 23 can have a length as great as three-sixteenths of an inch with ends thereof embedded between one-third and one-half length of each fiber-like or fibrous particle 23 into the mastic means 22 by sprinkling, jet spraying under gaseous pressure as well as electrostatically applying such particles 23 to the preform 20. A pair of conveyor sections 24 and 25 can be seen sequentially in FIGURE 1 to represent passage of the backing portion 21 first into a location where a suitable spreading device 26 can effect dispersal for layering of adhesive or mastic means 22 at least from one side of the backing portion 21. Subsequently the backing portion 21 with the mastic means 22 thereon passes to conveyor section 25 having a connection 27 to an electrostatic power unit 28 with an opposite connection 29 to a device 30 for emitting low-friction plastic particles 23 by spraying and flocking of the particles substantially transversely to be embedded into the adhesive or mastic means 22.

Figure 2:
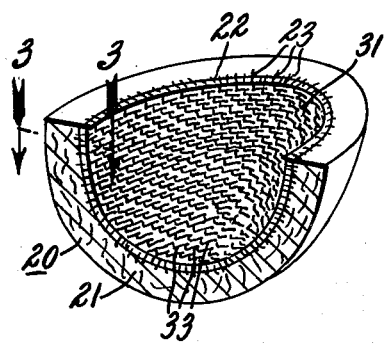
FIGURE 2 shows in perspective a spherical bearing surface embodying features in accordance with the present invention.
Figure 3:
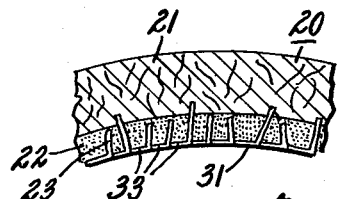
FIGURE 3 is a fragmentary sectional view taken along line 3—3 in FIGURE 2.

By a step of molding into a curved shape the preform 20 is cured to provide a bearing surface 31 as illustrated in views of FIGURES 2 and 3. This bearing surface 31 is formed collectively by bent-over free ends 33 of the low-friction fibrous particles 23. The bent-over ends 33 can be caused to form such a bearing surface 31 either by electrostatic orientation or by mechanical turning or swirling in a predetermined direction as molding into a curved configuration occurs. The fiber-like or fibrous particles can be made of Teflon or polytetrafluoroethylene, polychlorofluoroethylene as well as other low-friction plastic material including acetal resin also known as Delrin and a manufactured fiber in which the fiber-forming substance is any long chain synthetic polyamide having recurring amide groups as an integral part of a polymer chain otherwise known as nylon. By spraying or flocking the fiber-like particles 23 it is possible to embed ends thereof through the mastic means 22 into the backing portion 21 as indicated in FIGURE 3 such that free ends thereof bristle outwardly subject to bending over without formation of any specific mat with intertwined or interlaced continuous woven fibers to form an actual fabric. Yet, there is a positive interlocking and embedding of one end of each of the fibrous particles directly in resinous adhesive or mastic means at less cost than required to form a mat and interlaced structure. The low-friction plastic fibrous particles 23 having the bent-over ends 33 can be oriented into a circular pattern either in the preform stage or in the final molding and curing of materials.

Figure 4:
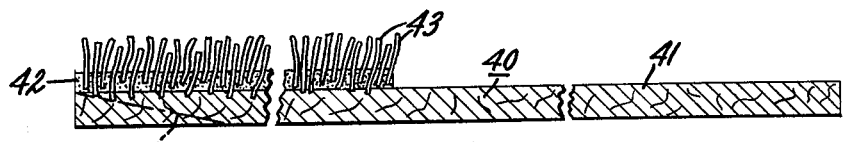
FIGURE 4 illustrates another multi-part preform manufactured in accordance with the present invention.
Figure 5:
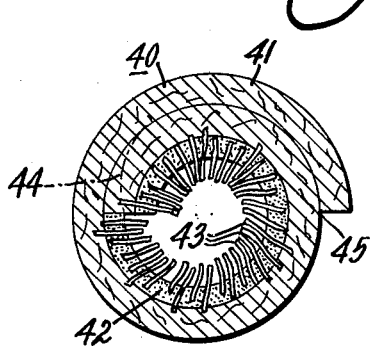
FIGURE 5 illustrates a step of spirally wrapping the preform of FIGURE 4.
Figure 6:
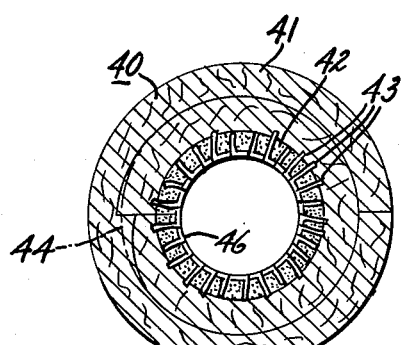
FIGURE 6 illustrates formation of a cylindrical bearing surface having features in accordance with the present invention.

FIGURE 4 illustrates a multi-part preform generally indicated by numeral 40 including a backing portion 41 adjacent to only one end of which there is added a layering of adhesive or mastic means 42 similar to that represented by numeral 22 in FIGURE 1. A plurality of low-friction fibrous particles 43 can be embedded substantially transversely relative to the mastic means 42 and an optional recess or cutout 44 to provide an incline adjacent to the end where the mastic means 42 is provided can be useful to form a spiral wrapping 45 of the multi-part preform 40 as indicated in FIGURE 5. A cylindrical bearing surface 46 can be formed as indicated in FIGURE 6 as a result of molding and curing of the preform 40. The cutout or recess 44 if provided accommodates formation of substantially annular simulated cylindrical configuration useful as a sleeve bearing. The cylindrical bearing surface 46 can be formed by circular orientation of the free ends of the fiber-like particles 43 as indicated earlier. The fibers, mastic means and base materials can be the same as those described with reference to FIGURE 1 except that a flocking of the fiber-like or fibrous particles is applied only to one end of the base material in order to form a cylindrical bearing surface when a "roll" preform is required. FIGURE 5 illustrates a wrapped preform before molding and FIGURE 6 shows a preform in its molded condition with the same fibers penetrating for interlock as indicated earlier. It is to be understood that the preform can be wrapped spirally to create a bearing surface cylindrically either on the inside or the outside and the free ends of the fiber-like or fibrous particles can be oriented either in a circular or axial-longitudinal manner generally. Orientation can occur for the fiber ends prior to wrapping up of the preform as indicated.

Figure 8:
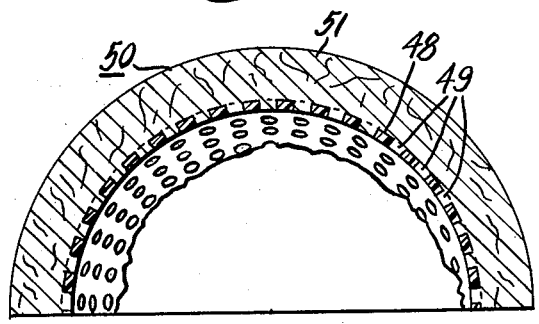
FIGURE 8 is a sectional view of the perforated sheet interlocked with a backing portion to form a low-friction self-lubricating bearing means in accordance with the present invention.
Figure 7:
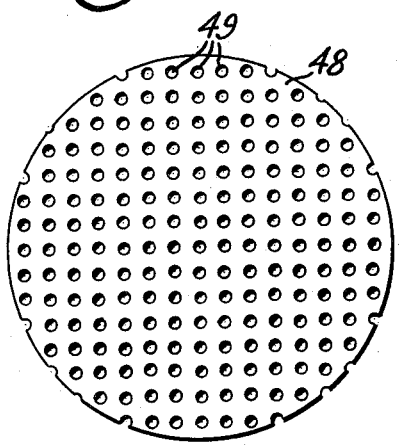
FIGURE 7 is a plan view of a perforated sheet of low-friction bearing material for use in accordance with the present invention.

FIGURE 7 illustrates a sheet 48 of low-friction bearing material such as Teflon and the like having a plurality of perforations or holes 49 therethrough. FIGURE 8 illustrates this low-friction material sheet 48 having the holes 49 molded into a spherically or curved form as part of a preform generally indicated by numeral 50 and including a backing portion 51 of materials similar to those previously described. The backing portion 51 can be resin impregnated with phenolic and the like subject to limited flow or oozing thereof into the apertures or holes 49 so as to form keys radially located to act as mechanical locks for holding the sheet 48 in place.

Figure 9:
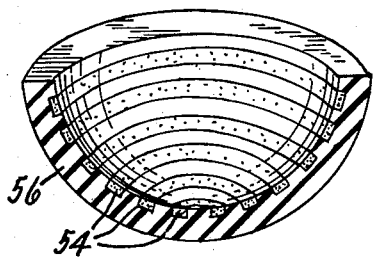
FIGURE 9 is a partially sectioned plan view of a curved multi-part preform of backing material and concentric ring portions of low-friction bearing material also in accordance with the present invention.

FIGURE 9 illustrates a similar mechanical locking by provision of a plurality of concentric ring portions 54 positioned to be at least partially embedded in an elastomeric backing portion 56. It is to be understood that differing diameters of such concentric ring portions can be used in differing sizes of spherical bearing means such that it would be possible to utilize all of low-friction sheet material subjected to punching or die cutting of such concentric ring portions of Teflon and similar materials.

Under molding pressures, resin impregnated material of the preform 50 as well as the elastomeric backing portion 56 can flow into the perforations or space between concentric ring portions to form key-like mechanical interlocks located radially inwardly or outwardly relative to the bearing surface provided by low-friction material exemplified by Teflon for the sheet 48 or ring portions.

Figure 10:
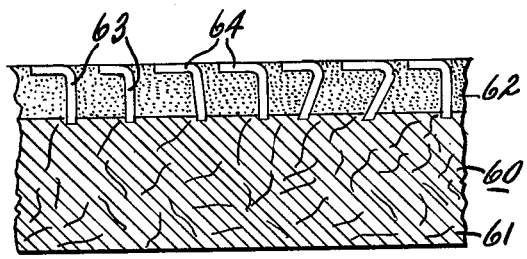
FIGURE 10 illustrates a multi-part preform of fibrous particles embedded into mastic means on a base portion and FIGURE 11 illustrates the same preform subjected to etching mechanically or chemically.
Figure 11:
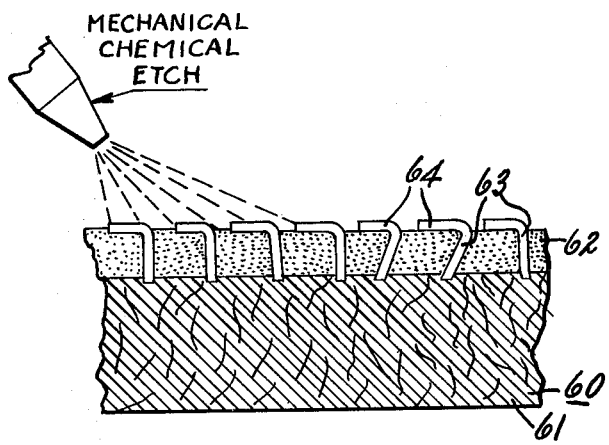

FIGURE 10 illustrates a multi-part preform generally indicated by numeral 60 including a backing portion 61, adhesive or mastic means 62 and a plurality of low-friction particles 63 that are initially totally embedded in the adhesive layering. FIGURE 11 illustrates the preform 60 being subjected to a step of etching mechanically such as by sand blasting or chemically such as by a weak alkaline or an acidic solution so as to expose bent-over ends 64 of the particles 63 thereby forming a low-friction bearing surface of Teflon, nylon, Delrin and similar materials. The step of etching will attack only the adhesive or mastic means 62 such that the ends 64 of the bearing particles become exposed to a predetermined depth and thus collectively form a bearing surface which can be planar or curved in configuration.

Figure 12:
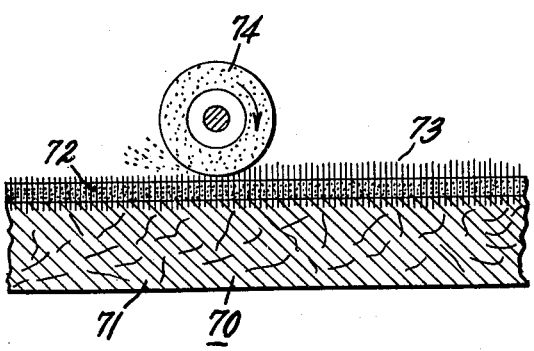
FIGURE 12 shows a machining off of ends of low-friction fibers embedded in a mastic means on a backing portion so as to leave isolated cross-section areas of burry ends thereof as a self-lubricating bearing means.

FIGURE 12 illustrates a preform generally indicated by numeral 70 including a backing portion 71 and mastic or adhesive means 72 in which a plurality of low-friction particles or fibrous members 73 are transversely embedded subject to abrading or grinding away by a wheel means 74 to leave a burred or fuzzy stubble. Thus, only isolated cross-sectional areas of the fibrous particles 73 remain as a bearing surface. Thus, a bearing surface is formed including collectively a plurality of fiber ends wherein substantially only cross-section of the fibrous particles per se extend laterally and are held relative to a matrix provided by the mastic and backing portion. In the event the preform is curved so as to have these low-friction particles along an inner surface thereof, the free ends of the particles will come closer to each other so as to concentrate low-friction characteristics thereof. It is to be understood that the resinous layering of the mastic means can be brought about by spraying or even rolling such material in a mobile condition onto the backing portion. The resinous layering of the mastic means is made relatively immobile by transverse anchoring and flocking of the low-friction particles thereto as described. Use of mono-filamentary fiber-like particles can facilitate embedding and flocking thereof transversely to the mastic means. Use of nylon as a flocking material in separate particles can occur with a length of individual fiber-like particles of substantially .030 inch. It is to be understood that in some instances it is also possible to spray such low-friction material in a thin layer on one side of a backing portion. Also, it is possible to have the backing portion per se made as a mixture of fibers and suitable resin either as a dry blend, slurry, or pasty compound moldable to a predetermined shape. Such a mixture of materials can be formed as a dry powder utilizing sisal or vegetable fibers as well as cotton material scraps subsequently coated or painted with a mastic means or adhesive resin such as phenolic to make the mixture tacky subject to electrostatic flocking or spraying of Teflon particles and the like to a surface thereof for bearing purposes. A floury or powdery composition of low-friction particles can also be sprayed such that under pressure the powder will cold flow and penetrate backing material.

When an etching procedure is used to expose low-friction fiber particles there is, in effect, an exposure of ends of the fibrous particles due to mechanical removal of mastic by sand blasting or chemical etching thereof with a weak alkaline solution such as formed by lye soap. Dilute sodium hydroxide could be used with caution. Also, it is to be noted that in place of cotton ducking a paper mix or rubber backing can be provided as a cushion. Resilience of the elastomeric materials exemplified by rubber can eliminate provision of metal spring means as a backing for a self-lubricating bearing means in accordance with the present invention.

While the embodiments of the present invention as herein disclosed constitute preferred forms, it is to be understood that other forms might be adopted and reference can be made to a copending application Ser. No. 164,098, Couch et al., filed concurrently herewith.

What is claimed is as follows:

1. A method for manufacture of a self-lubricating bearing comprising the steps of, applying to a backing portion of a cellulosic sheet a layer of thermosetting adhesive resin comprising one of the resins from the group consisting of phenolic and epoxide, spray flocking fibers of a self-lubricating thermosetting resinous material which is resistant to an alkaline etching solution into said adhesive whereby generally upstanding fibers are embedded in said adhesive, and preferentially etching the adhesive resin leaving a sufficient layer of adhesive resin to retain the fibers and provide a bearing surface of exposed fiber ends of the self-lubricating resinous material.

2. The procedure of claim 1 wherein said etching is by means of a dilute sodium hydroxide solution.

References Cited by the Examiner
UNITED STATES PATENTS

| | | | |
|---|---|---|---|
| 2,887,366 | 5/59 | Oberdorfer | 156—2 |
| 2,900,270 | 8/59 | Klein | 117—33 X |
| 2,919,219 | 12/59 | Smith | 154—125 |
| 3,005,295 | 10/61 | Tucker | 117—33 X |
| 3,030,248 | 4/62 | Runton | 154—43 |
| 3,053,593 | 9/62 | Blair et al. | |

ALEXANDER WYMAN, *Primary Examiner.*

JACOB STEINBERG, EARL M. BERGERT, *Examiners.*